United States Patent
Sen et al.

(10) Patent No.: US 8,873,563 B2
(45) Date of Patent: Oct. 28, 2014

(54) TECHNIQUES FOR NEXT-HOP OPTIMIZATION

(75) Inventors: Siddhartha Sen, Sunnyvale, CA (US); Yi Zhang, Saratoga, CA (US); Hasnain Karampurwala, San Jose, CA (US); Ram Dular Singh, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 416 days.

(21) Appl. No.: 12/610,143

(22) Filed: Oct. 30, 2009

(65) Prior Publication Data

US 2011/0069706 A1   Mar. 24, 2011

Related U.S. Application Data

(60) Provisional application No. 61/244,385, filed on Sep. 21, 2009.

(51) Int. Cl.
| | |
|---|---|
| *H04L 12/28* | (2006.01) |
| *H04L 12/56* | (2006.01) |
| *G06F 15/173* | (2006.01) |
| *H04L 12/701* | (2013.01) |
| *H04L 12/751* | (2013.01) |
| *H04L 12/755* | (2013.01) |
| *H04L 12/741* | (2013.01) |

(52) U.S. Cl.
CPC .............. *H04L 45/00* (2013.01); *H04L 45/021* (2013.01); *H04L 45/741* (2013.01); *H04L 45/54* (2013.01); *H04L 45/02* (2013.01)
USPC ........................ 370/395.31; 370/392; 709/239

(58) Field of Classification Search
None
See application file for complete search history.

(56) References Cited

U.S. PATENT DOCUMENTS

| | | | |
|---|---|---|---|
| 6,192,051 B1 * | 2/2001 | Lipman et al. ................ | 370/389 |
| 6,393,486 B1 | 5/2002 | Pelavin et al. | |
| 7,058,016 B1 | 6/2006 | Harper | |
| 7,158,486 B2 | 1/2007 | Rhodes | |
| 7,185,107 B1 | 2/2007 | Cassar | |
| 7,230,924 B2 | 6/2007 | Chiu et al. | |
| 7,269,133 B2 | 9/2007 | Lu et al. | |
| 7,428,213 B2 | 9/2008 | Vasseur et al. | |
| 7,460,481 B2 | 12/2008 | Vasseur et al. | |
| 7,545,756 B2 | 6/2009 | Previdi | |
| 7,554,921 B2 | 6/2009 | Previdi et al. | |
| 7,987,288 B2 | 7/2011 | Charzinski et al. | |
| 8,189,585 B2 * | 5/2012 | Dharwadkar et al. ......... | 370/392 |
| 8,503,464 B2 | 8/2013 | Punati et al. | |
| 2003/0179742 A1 | 9/2003 | Ogier et al. | |
| 2005/0015511 A1 | 1/2005 | Izmailov et al. | |
| 2005/0078656 A1 | 4/2005 | Bryant et al. | |

(Continued)

OTHER PUBLICATIONS

Non-Final Office Action for U.S. Appl. No. 12/544,170, mailed on Aug. 1, 2011, 22 pages.

(Continued)

*Primary Examiner* — Faruk Hamza
*Assistant Examiner* — Cassandra Decker
(74) *Attorney, Agent, or Firm* — Kilpatrick Townsend and Stockton LLP

(57) ABSTRACT

Techniques for efficiently storing and using routing and associated next-hop information in a network device. The amount of next-hop information that is stored for routes in a routing table is reduced by reducing the amount of duplicate next-hop information that is stored by a network device.

9 Claims, 14 Drawing Sheets

(56) References Cited

U.S. PATENT DOCUMENTS

| | | | |
|---|---|---|---|
| 2005/0088965 | A1 | 4/2005 | Atlas et al. |
| 2005/0088977 | A1* | 4/2005 | Roch et al. ............... 370/254 |
| 2005/0135256 | A1 | 6/2005 | Ball et al. |
| 2006/0159083 | A1 | 7/2006 | Ward et al. |
| 2006/0215579 | A1* | 9/2006 | Nadeau et al. ............ 370/254 |
| 2007/0041379 | A1 | 2/2007 | Previdi et al. |
| 2007/0112975 | A1 | 5/2007 | Cassar |
| 2007/0248065 | A1* | 10/2007 | Banerjea et al. ........... 370/338 |
| 2008/0107114 | A1* | 5/2008 | Liu ........................ 370/392 |
| 2010/0080235 | A1* | 4/2010 | Yamate et al. ......... 370/395.31 |
| 2010/0296517 | A1* | 11/2010 | Kompella ................. 370/408 |
| 2011/0044351 | A1 | 2/2011 | Punati et al. |
| 2011/0075673 | A1 | 3/2011 | Hardie et al. |
| 2012/0294166 | A1 | 11/2012 | Punati et al. |
| 2014/0044013 | A1 | 2/2014 | Punati et al. |

OTHER PUBLICATIONS

U.S. Appl. No. 12/544,170, filed Aug. 19, 2009, Punati et al.
Callon, "Use of OSI IS-IS for Routing in TCP/IP and Dual Environments," RFC 1195, Dec. 1990, 80 pages.
Hopps, "Routing IPv6 with IS-IS," Standards Track, RFC 5308, Oct. 2008, 8 pages, The IETF Trust.
"IS-IS Incremental SPF," Prerequisites for IS-IS Incremental SPF, 8 pages, Cisco Systems, CA, Copyright 2003-2005.
Li, et al., "Domain-Wide Prefix Distribution with Two-Level IS-IS," RFC 5302, Standards Track, Oct. 2008, 15 pages, The IETF Trust.
Mills, "Exterior Gateway Protocol Formal Specification," RFC 904, Apr. 1984, 30 pages.
Moy, "OSPF Version 2," RFC 2328, Standards Track, Apr. 1998, 204 pages, The Internet Society.
"Routing Freak! Shortest Path First (SPF) Algorithm Demystified," Mar. 6, 2008, 9 pages, printed on Oct. 6, 2008 at URL: http://routingfreak.wordpress.com/2008/03/06/shortest-path-first-algorithm-demystified/.
"Routing Freak! Shortest Path First (SPF) Calculation in OSPF and IS-IS," Mar. 4, 2008, 6 pages, printed on Oct. 6, 2008 at URL: http://routingfreak.wordpress.com/2008/03/04/shortest-path-first-calculation-in-ospf-and-is . . . .
"Routing Freak! The Complete and Partial SPF in IS-IS," Mar. 6, 2008, 3 pages, printed on Oct. 8, 2008 at URL: http://routingfreak.wordpress.com/2008/03/06/the-complete-and-partial-spf-in-is-is/.
Non-Final Office Action for U.S. Appl. No. 12/544,170, mailed on Jun. 18, 2012, 7 pages.
Punati, et al., "Techniques for Efficiently Updating Routing Information," U.S. Appl. No. 13/177,028, filed Jul. 6, 2011, 85 pages.
Notice of Allowance for U.S. Appl. No. 13/177,028 mailed on Mar. 4, 2013, 7 pages.
U.S. Appl. No. 13/926,665, filed Jun. 24, 2013 by Punati et al. (Unpublished.).
Notice of Allowance for U.S. Appl. No. 12/544,170 mailed on Jun. 24, 2013, 10 pages.
Notice of Allowance for U.S. Appl. No. 13/177,028 mailed on Mar. 26, 2013, 6 pages.
Notice of Allowance for U.S. Appl. No. 12/544,170 mailed on Dec. 13, 2012, 8 pages.
Non-Final Office Action for U.S. Appl. No. 13/925,665 mailed on Aug. 13, 2014, 7 pages.

* cited by examiner

TECHNIQUES FOR NEXT-HOP OPTIMIZATION

CROSS-REFERENCES TO RELATED APPLICATIONS

The present application is a non-provisional of and claims the benefit and priority under 35 U.S.C. 119(e) of U.S. Provisional Application No. 61/244,385 filed Sep. 21, 2009, entitled TECHNIQUES FOR NEXT-HOP OPTIMIZATION, the entire contents of which are incorporated herein by reference for all purposes.

BACKGROUND

Embodiments of the present invention relate to networking, and more particularly to techniques for optimizing the manner in which next-hop information associated with routing information is stored and used by a network device.

A networking environment typically comprises multiple networks. The networks may be of the same or different types and may use the same or different communication protocols for communication of data. Communication of data within the networks and also between the networks is typically facilitated by network devices such as routers, switches, etc. A network device may be connected to one or more other network devices and/or networks via one or more links or interfaces.

In a typical network environment, the number of network devices is generally far less than the number of networks that are connected by the network devices. For example, the number of network devices in a network environment may be in the order of hundreds while the number of networks is typically in the order of ten thousand, hundred thousand, etc. The number of networks in a network environment is thus typically several orders of magnitude greater than the number of network devices. Further, in a typical network environment, the number of network devices directly connected to (or neighboring) a specific network device is generally far less than the number of networks or routes in the network that are reachable via the specific network device.

As indicated above, network devices are connected to each other or to networks via links. A cost may be associated with a link signifying the cost of communicating data via that link. The cost associated with a link may be based upon various different metrics such as link bandwidth, delay, etc. The cost associated with a link while carrying data in one direction may be different from the cost associated with the same link while carrying data in the opposite direction.

In order to facilitate communication of data, a network device stores routing information that is used by the network device to determine how data received by the network device is to be forwarded to facilitate communication of the data to its intended destination. The routing information may be stored in the form of a routing table. The routing table for a network device stores information for a set of routes that are reachable from the network device via some neighboring network devices. A route in the routing table may be an address associated with a network device or a network in the network environment. The set of routes stored in a routing table for a network device thus represents a set of addresses associated with network devices or networks that are reachable from the network device. Each route in a routing table for a network device is generally associated with a next-hop entry, where the next-hop entry identifies one or more addresses of neighboring network devices to which data received by the network device is to be forwarded in order to facilitate communication of the data for the route, and for each such address, a link connected to the address and to be used for communicating data to the address.

Since the number of routes in a routing table can be very large, the size of the routing table itself can be quite large. Accordingly, a large amount of valuable memory resources have to be allocated for storing the routing and next-hop information. The increased size of the routing and next-hop information also makes it difficult and cumbersome to process.

BRIEF SUMMARY

Embodiments of the present invention provide techniques for efficiently storing and using next-hop information associated with a routing table in a network device. In one embodiment, the amount of next-hop information that is stored by a network device for routes in a routing table is optimized by reducing the amount of duplicate information that is stored as part of the next-hop information. The next-hop information is stored in a manner that facilitates fast and efficient updates to the routing and/or associated next-hop information responsive to changes in the network environment.

According to an embodiment of the present invention, techniques (including methods, systems, and computer-readable storage medium storing instructions executable by a processor) are provided for minimizing the amount of next-hop information stored by a network device. In one embodiment, a network device may store in its memory a routing table comprising a plurality of routes reachable from the network device. The network device may also store next-hop information associated with the routing information. The next-hop information may comprise a set of one or more next-hops, each next-hop associated with a set of one or more pairs, each pair identifying a link and an address. The set of next-hops may comprise a first next-hop associated with a first route in the plurality of routes, the first next-hop stored in a first portion of the memory. A second route in the plurality of routes may be associated with the same first next-hop stored in the first portion of the memory, thereby sharing the first next-hop between the first route and the second route.

In one embodiment, a network device may be configured to determine a first set of pairs for the second route, and determine whether the set of next-hops comprises a next-hop that comprises exactly the first set of pairs. Upon determining that the first next-hop comprises exactly the first set of pairs, the second route is associated with the first next-hop.

In one embodiment, by enabling sharing of next-hops between routes in a routing table, the number of next-hops is not tied to the number of routes in the routing table. For example, in one embodiment, the number of next-hops in the set of next-hops may be less than the number of routes in the plurality of routes. Accordingly, the amount of memory required for storing the next-hops is reduced.

In one embodiment, it may be beneficial for two routes or more routes in the routing table to be associated with different next-hops even though the pairs in the next-hops are the same. This may be accomplished by associating an attribute with each next-hop. The attribute can be set to different values for different next-hops. For example, two different next-hops may have the same set of pairs but have their attributes may be set to two different values to differentiate between the two next-hops. This enables the two next-hops to be treated independently even though they comprise an identical set of pairs. A first of the two next-hops may be associated with a first route in the routing table while the second next-hop may be associated with a second route in the routing table.

According to an embodiment, a network device may store a routing table comprising a plurality of routes and next-hop information associated with the routing table. The next-hop information may comprise a set of one or more next-hops, each next-hop associated with one or more pairs from a set of pairs, each pair identifying a link and an address. The plurality of routes may comprise a first route associated with a first next-hop from the set of next-hops. The first next-hop may be associated with a first pair from the plurality of pairs, the first pair stored in a first portion of the memory. A second route from the plurality of routes may be associated with a second next-hop in the set of next-hops, where the second next-hop is associated with the first pair stored in the first portion of the memory, thereby sharing the first pair between the first next-hop and the second next-hop.

In one embodiment, the network device may be configured to determine an address and an associated link for the second next-hop, and determine whether the set of pairs comprises a pair that comprises exactly the address and the associated link determined for the second next-hop. As part of the processing, the network device may determine that the first pair comprises exactly the address and the associated link determined for the second next-hop, and then associate the first pair with the second next-hop.

Enabling sharing of pairs between next-hops reduces the amount of memory needed for storing next-hop information. For example, a set of memory objects may store information for a set of pairs, each memory object storing information for a pair from the set of pairs. In one embodiment, the number of memory objects may be less than the number of next-hops. In this manner, the number of pairs is not tied to the number of next-hops.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention relate to techniques for optimizing the manner in which routing and associated next-hop information is stored and used by a network device. Techniques are provided for efficiently storing and using next-hop information associated with a routing table in a network device. In one embodiment, the amount of next-hop information that is stored by a network device for routes in a routing table is optimized by reducing the amount of duplicate information that is stored as part of the next-hop information. The next-hop information is stored in a manner that facilitates fast and efficient updates to the routing and/or associated next-hop information responsive to changes in the network environment.

Figure 1:
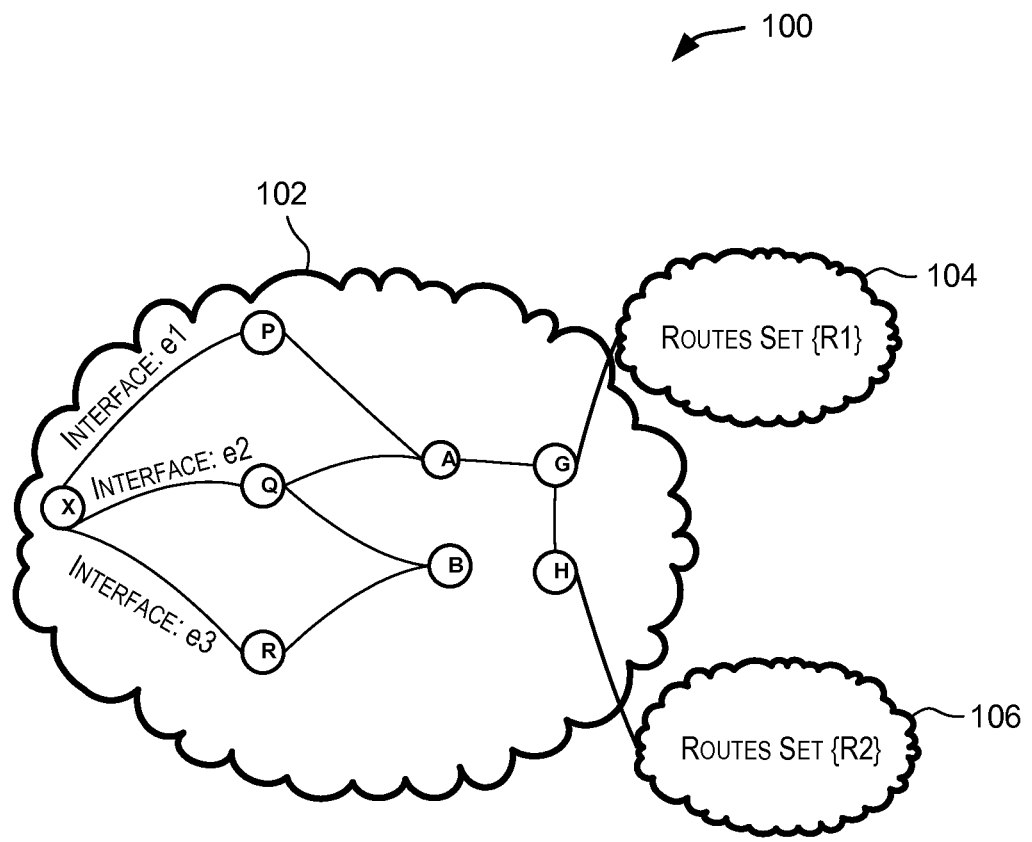
FIG. 1 is a simplified diagram of a network environment that may incorporate an embodiment of the present invention.

FIG. 1 depicts an example of a network environment 100 that may incorporate an embodiment of the present invention. In the embodiment depicted in FIG. 1, network environment 100 comprises three separate networks 102, 104, and 106. Further, network 102 comprises several network devices including network devices X, P, Q, R, A, B, G, and H with links connecting the network devices. The network devices may be routers, switches, etc. such as routers and switches provided by Brocade Communications Systems, Inc. One or more of the network devices may be configured according to the teachings of the present invention to optimize the manner in which next-hop information is stored and used by the network device.

A network device depicted in FIG. 1 may store routing information that is used by the network device to determine how data received by the network device is to be forwarded to facilitate communication of the data to its intended destination. The routing information may be stored in the form of a routing table. The routing table stored by a network device may comprise information for a set of routes that are reachable from the network device via some neighboring network device. A route specified in the routing table may be an address associated with a network device or a network in the network environment. The set of routes stored in a routing table for a network device represent a set of addresses associated with network devices or networks that are reachable from the network device.

Each route in a routing table for a network device is associated with a next-hop entry (referred to as "next-hop"), where the next-hop entry comprises information identifying one or more addresses of neighboring network devices to which data received by the network device is to be forwarded in order to facilitate communication of the data to the route, and for each address, a link connected to the address and to be used for communicating data to the address. A network device thus stores a routing table and associated next-hop information that is used by the network device to make data forwarding decisions. The next-hop information associated with a route in the routing table may identify multiple such address-link pairs, each pair identifying an address of a next hop network device and a link to be used for forwarding data to the next hop network device. The set of next-hops associated with routes in a routing table represent next-hop information associated with the routing table.

For purposes of this application, the term "route-information" or "route-info" (RI) is used to refer to a pair of a neighboring network device's address and an outgoing interface (or link) connected to the address. The next-hop for a route in a routing table is thus a collection of one or more RIs. In situations where there is exactly one path to get to a route, the next-hop for that route will comprise exactly one RI. In other situations where there are multiple equal cost distinct paths to get to a route, the next-hop for that route may comprise multiple RIs.

In network environment 100, looking at network device X in network 102, there are three connections to neighboring network devices P, Q, and R via interfaces e1, e2, and e3, respectively. Accordingly, there are three possible RIs: (e1, P), (e2, Q) & (e3, R). For simplicity, assuming all interfaces are of equal cost, then to reach an address associated with A from X, the data may be routed either via P or via Q. Accordingly, the Equal Cost MultiPaths (ECMP) for destination A for network device X are represented by RIs: (e1, P) & (e2, Q). Similarly for:

Destination B: data may be routed via ECMP RIs: {(e2, Q), (e3, R)}

Destination G: data may be routed via ECMP RIs: {(e1, P), (e2, Q)}

Destination H: data may be routed via ECMP RIs: {(e1, P), (e2, Q)}

Set {R1} represents a set of routes in network 104 that are reachable from network device X.

For each route in {R1}: data may be routed via ECMP RIs: {(e1, P), (e2, Q)}

Set {R2} represents a set of routes in network 106 that are reachable from network device X.

For each route in {R2}: data may be routed via ECMP RIs: {(e1, P), (e2, Q)}.

Figure 2:
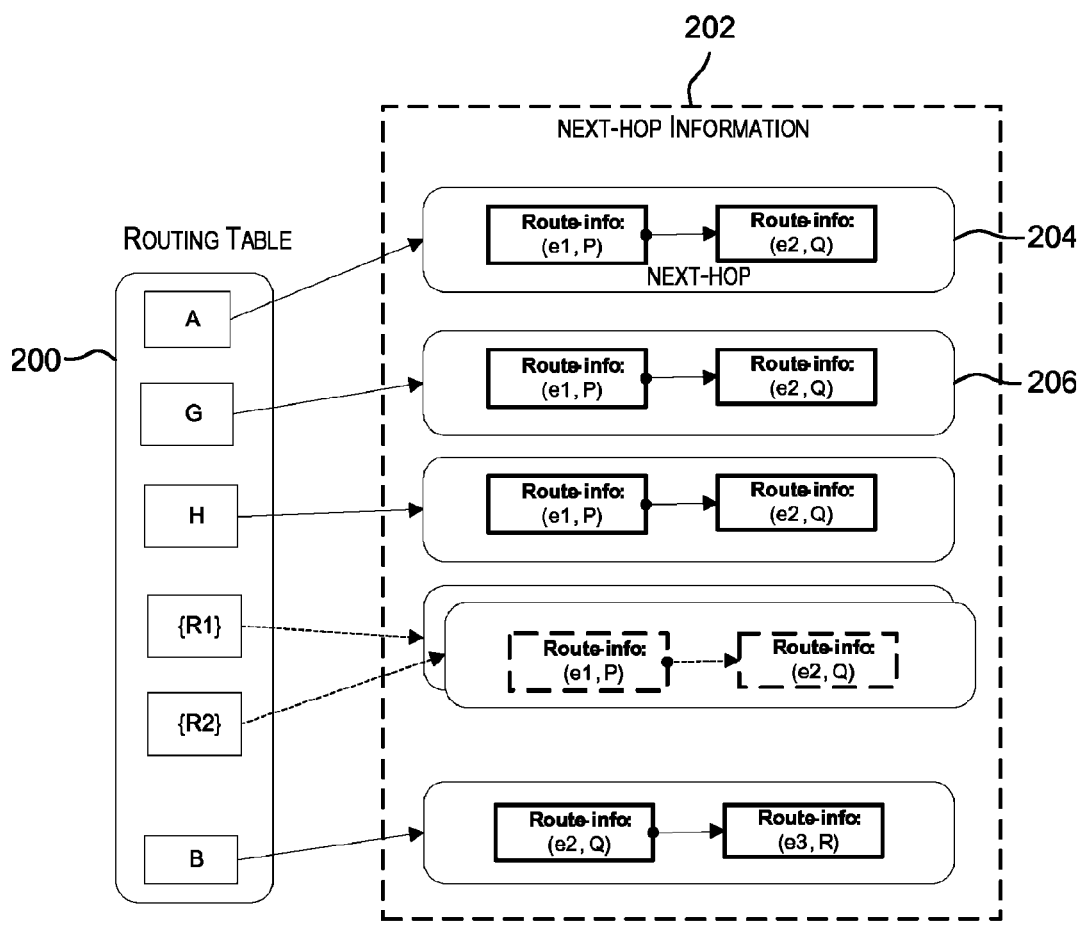
FIG. 2 depicts an implementation of a routing table and associated next-hop information.

In one implementation, each route in the routing table for a network device points to a set of RIs to reach the route. For example, FIG. 2 depicts a way for storing next-hop information associated with a routing table. FIG. 2 depicts a routing table 200 and associated next-hop information 202 that may be stored for network device X in FIG. 1. As depicted in FIG. 2, routing table 200 comprises a set of routes that are reachable from network device X. In the example shown in FIG. 2, these routes include a route associated with network device A, a route associated with network device G, a route associated with network device H, a route associated with network device B, a set of routes {R1} in network 104, and a set of routes {R2} in network 106. Each route is further associated with (or points to) a next-hop for the route. For example, route for A points to next-hop 204, route for G points to next-hop 206, and so on.

Each next-hop comprises a set of RIs. For example, the route associated with A points to next-hop 204 comprising a set of RIs {(e1, P) and (e2, Q)}, the route associated with G points to another next-hop 206 comprising a set of RIs {(e1, P) and (e2, Q)}, the route associated with H points to another next-hop comprising a set of RIs {(e1, P) and (e2, Q)}, each route in set {R1} points to a separate next-hop, each comprising the set of RIs (e1, P) and (e2, Q), each route in set {R2} points to a separate next-hop, each comprising the set of RIs (e1, P) and (e2, Q), and the route associated with B points to another next-hop comprising a set of RIs {(e2, Q) and (e3, R)}.

As can be seen from FIG. 2, many routes in routing table 200 are associated with an identical set of RIs. For example, in FIG. 2, routes associated with A, G, H, {R1}, and {R2} all have the same RIs repeated in their next-hops. Accordingly, in the implementation depicted in FIG. 2, the contents of the sets of RIs in the next-hop information associated with the routing table are replicated many times for different routes. Since the number of routes stored by a routing table is typically very large, this translates to a large amount of memory required to store associated next-hop information, a large percentage of which is duplicate data. This not only results in memory wastage but also makes the data difficult and cumbersome to process, for example when changes need to be made to the routing table or the next-hop information.

According to an embodiment of the present invention, a network device is configured to reduce the amount of memory needed for storing the next-hop information that is associated with a routing table stored by the network device. In one embodiment, this is done by reducing the storage of replicated or redundant information in the next-hop information, as described below in detail.

As described above with respect to FIG. 2, the next-hop information associated with routes in a routing table comprises a large amount of redundant information that is replicated for several different routes. For example, in the example depicted in FIG. 2, even though routes associated with A, G, H, routes in {R1}, and routes in {R2} have the same set of RIs in their next-hops, the next-hops are replicated for each of the routes. As a result a large amount of redundant information is replicated. According to an embodiment of the present invention, this redundancy is reduced by enabling a next-hop to be shared by two or more routes in the routing table. In one embodiment, if the next-hops for two or more routes are the same in that the next-hops comprise the same set of one or more RIs, then a single next-hop may be defined comprising the set of one or more RIs and that single next-hop may then be shared by the two or more routes.

For example, for the network environment depicted in FIG. 1, from the perspective of network device X, there are two unique sets of RIs and accordingly two next-hops may be defined as follows:

(1) NH1: a next-hop comprising the set of RIs: {(e1, P), (e2, Q)}; and (2) NH2: a next-hop comprising the set of RIs: {(e2, Q), (e3, R)}.

Using these next-hops, the routes in the routing table for network device X may be associated with next-hops as follows (for the network environment depicted in FIG. 1):

For route associated with A: route data via next-hop NH1;
For route associated with B: route data via next-hop NH2.;
For route associated with G: route data via next-hop NH1;
For route associated with H: route data via next-hop NH1;
For each route in set of routes {R1}: route data via next-hop NH1; and
For each route in set of routes {R2}: route data via next-hop NH1.

Figure 3A:
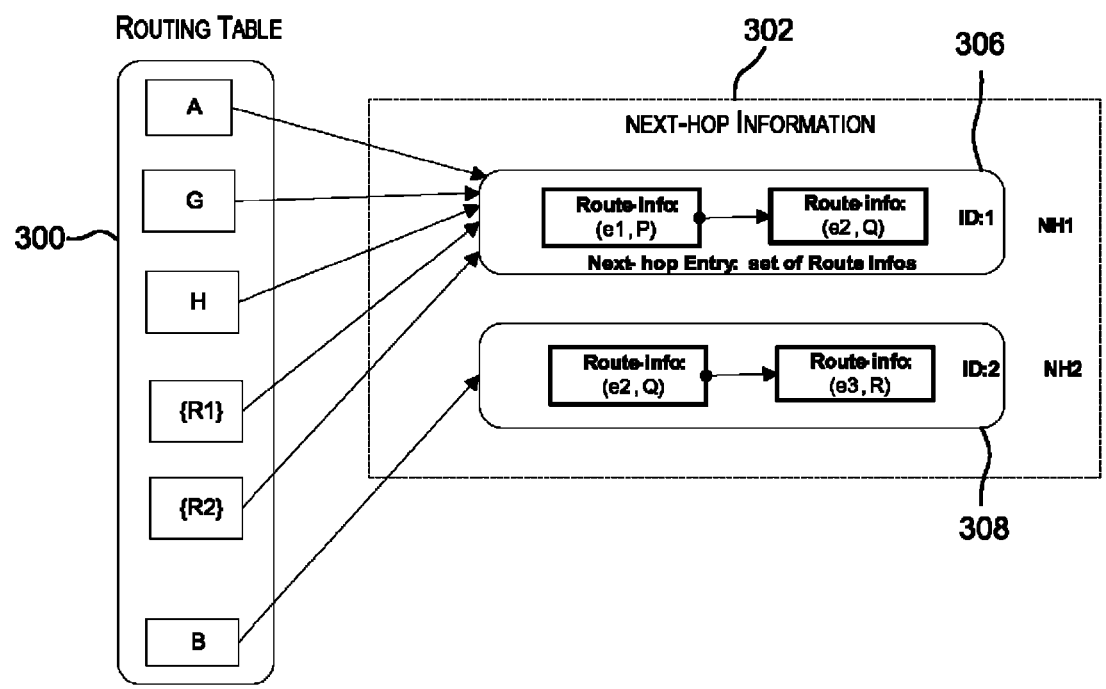
FIG. 3A depicts a logical view of a routing table and associated next-hop information wherein next-hops included in the next-hop information are shared by routes in the routing table according to an embodiment of the present invention.

FIG. 3A depicts a logical view of a routing table 300 and associated next-hop information 302 wherein next-hops included in the next-hop information are shared by routes in the routing table according to an embodiment of the present invention. As depicted in FIG. 3A, routing table 300 comprises a set of routes that are reachable from network device X in the network environment depicted in FIG. 1. The routes include a route associated with network device A, network device G, network device H, network device B, a set of routes {R1} in network 104, and a set of routes {R2} in network 106. Each route is associated with a next-hop that comprises a set of RIs. However, unlike FIG. 2, multiple routes may be associated with (or point to) the same next-hop if the set of RIs included in the next-hop is the same for those multiple routes. In this manner, a next-hop comprising a set of RIs can be shared by multiple routes. For example, as depicted in FIG. 3A, the routes associated with network device A, network device G, network device H, routes in {R1}, and the routes in {R2} all point to the same next-hop NH1 306 that comprises RIs {(e1, P), (e2, Q)}. The route associated with network device B points to a second next-hop NH2 308 that comprises RIs {(e2, Q), (e3, R)}. In this manner, instead of having multiple separate memory structures for storing redundant RI information (as in FIG. 2), the embodiment depicted in FIG. 3A requires only two memory structures, one for storing RIs {(e1, P), (e2, Q)} and the other for storing RIs {(e2, Q), (e3, R)}. These memory structures are then shared by the routes in the routing table.

There are various ways in which next-hop information 302 may be implemented and associated with routing table 300. In one embodiment, each next-hop may be implemented as an array with each element of the array storing an RI. In this embodiment, a route entry in routing table 300 may point to the array representing the next-hop to be associated with the route entry. In another embodiment, each next-hop may be implemented as a linked list with each member of the linked list representing an RI. In this embodiment, a route entry in routing table 300 may point to the head of the linked list such that the linked list may be traversed to determine the RIs in the linked list. Various other implementations are possible in alternative embodiments.

Figure 3B:
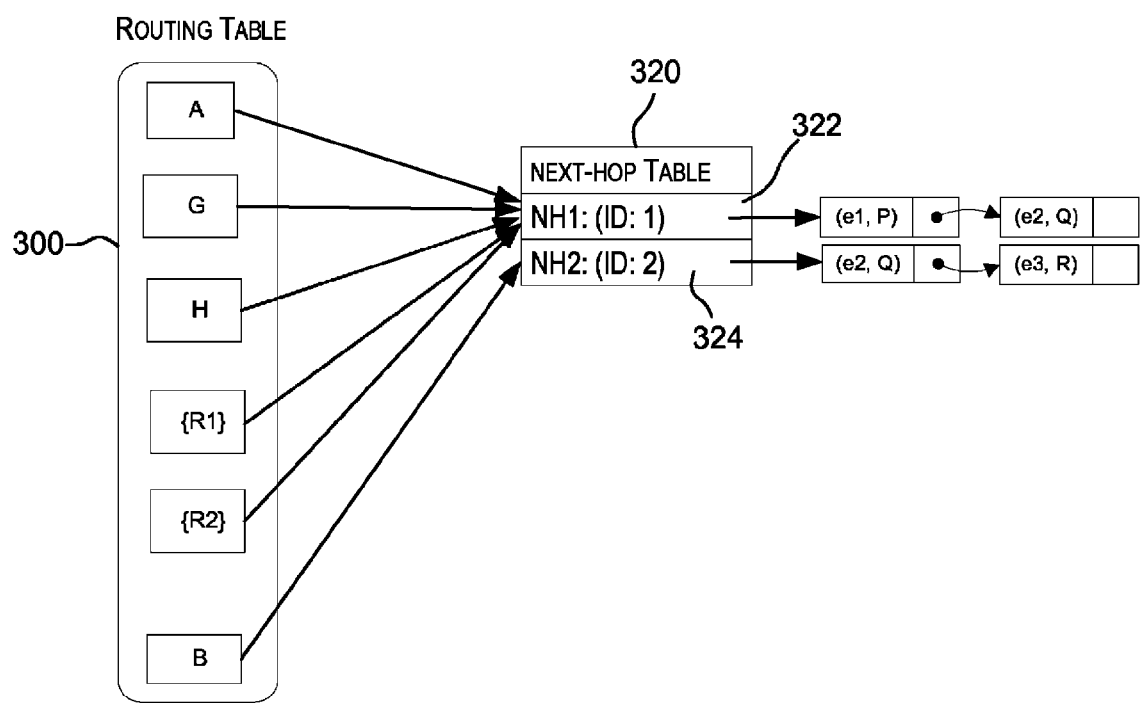
FIG. 3B depicts a simplified implementation of next-hop information according to an embodiment of the present invention.

FIG. 3B depicts a simplified implementation of next-hop information according to an embodiment of the present invention. As depicted in FIG. 3B, the next-hop information may comprise an array or table of next-hops. Each next-hop entry in table 320 may comprise a pointer pointing to a set of RIs included in that next-hop. For example, table entry 322 corresponds to next-hop NH1 and points to RIs (e1, P) and (e2, Q) that are members of NH1. Table entry 324 corresponds to next-hop NH2 and points to RIs (e2, Q) and (e3, R) that are members of NH2. Routes associated with A, G, H, {R1}, and {R2} in routing table 300 are all associated with next-hop table entry 322 for NH1. Route for B is associated with next-hop table entry 324 for NH2.

From the perspective of memory storage, the memory object or portion of memory (in this case table entry 322 and associated RI list) storing information for NH1 is shared by multiple routes in the routing table. Multiple routes from the routing table may be associated with the same portion of memory storing information for a next-hop. In this manner, only one memory object needs to be stored for NH1 and this object is shared between multiple routes in the routing table.

Accordingly, in one embodiment, multiple routes in a routing table can point to a common next-hop thereby sharing that next-hop between the routes. By enabling sharing of next-hops between routes of the routing table, each route does not need to maintain its own separate set of RIs. The sharing of next-hops enables redundant sets of RI information to be consolidated into a single next-hop that can be shared by different routes. This significantly reduces the amount of memory required for storing next-hop information associated with a routing table. The memory savings are quite significant since the number of distinct next-hops that are needed is typically far less then the number of routes in a routing table. In the implementation depicted in FIG. 2, the number of next-hops needed was equal to the number of routes in the routing table since each route had its own next-hop, and accordingly, the amount of memory needed for storing the next-hop information was directly dependent on the number of routes in the routing table. However, by enabling sharing of next-hops, the number of next-hops is dramatically reduced since a single next-hop can be shared by multiple routes in the routing table. For the embodiment depicted in FIGS. 3A and 3B, the number of next-hops needed for a routing table may be far less than the number of routes in the routing table. Accordingly, the size of the next-hop information that is associated with a routing table is also reduced for the embodiments depicted in FIGS. 3A and 3B when compared to the implementation depicted in FIG. 2A.

In one embodiment, each next-hop may be assigned a unique identifier (ID) that may be used to refer to the next-hop. In one embodiment, a 32-bit ID is used to identify each next-hop. A next-hop with the same ID may be shared between multiple routes in the routing table.

Figure 4:
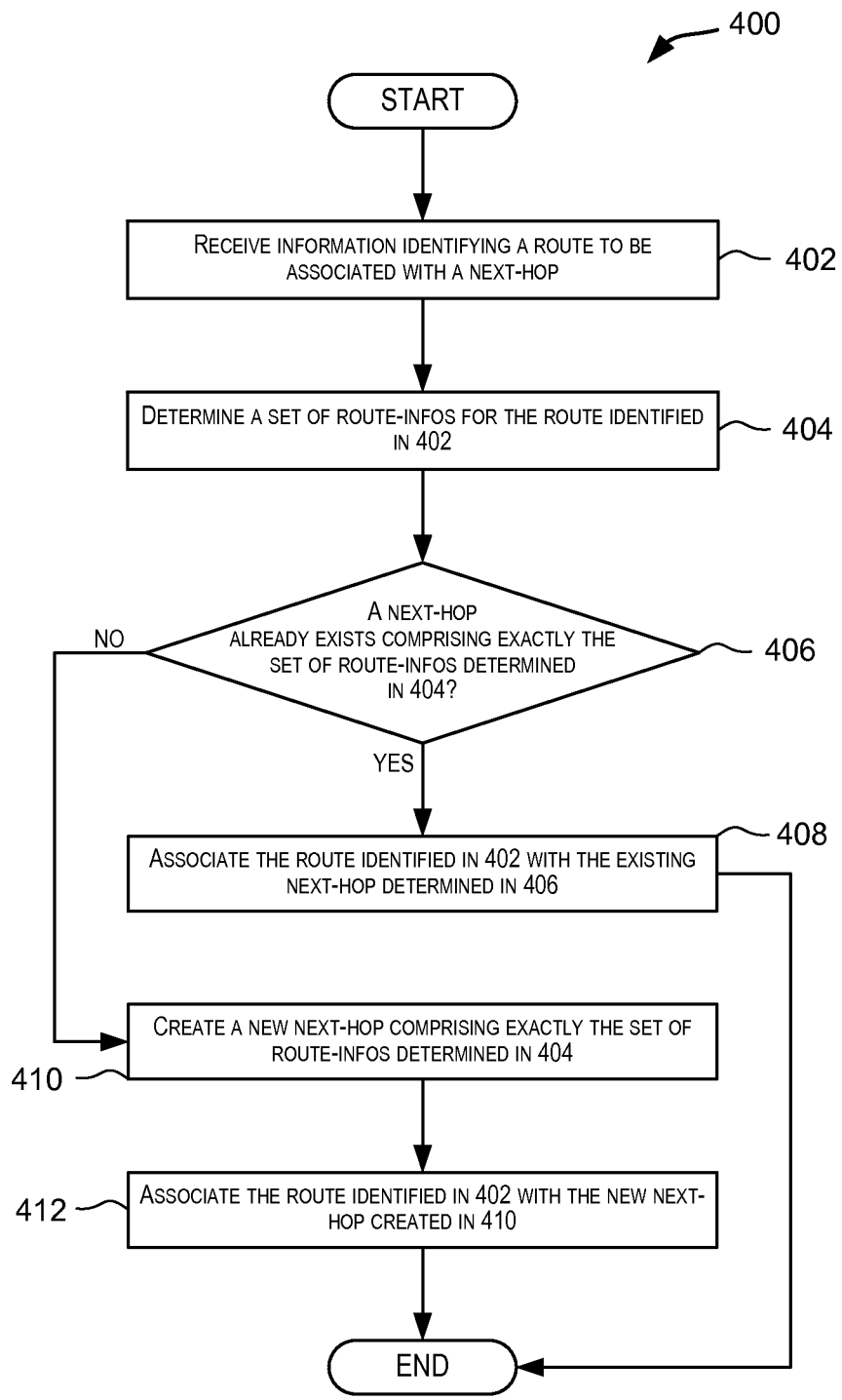
FIG. 4 depicts a high level simplified flowchart depicting a method performed by a network device for associating a route in a routing table with a next-hop according to an embodiment of the present invention.

FIG. 4 depicts a high level simplified flowchart 400 depicting a method performed by a network device for associating a route in a routing table with a next-hop according to an embodiment of the present invention. The processing depicted in FIG. 4 may be performed in software (e.g., instructions, code, program) executed by a processor, in hardware, or combinations thereof. The software may be stored on a computer-readable storage medium. In one embodiment, the method may be performed by a network device depicted in FIG. 1, for example, network device X.

Information may be received identifying a route in a routing table that is to be associated with a next-hop (step 402). The set of RIs for the route identified in 402 may be determined (step 404). A check is then made to see if a next-hop already exists comprising exactly the set of RIs determined in 404 (step 406). If it is determined in 406 that a next-hop already exists that includes exactly the set of RIs determined in 404, then the route is associated with that next-hop (step 408). In this manner, the previous next-hop is shared. If it is determined in 406 that a next-hop that includes exactly the set of RIs determined in 404 does not already exist, then a new next-hop is created comprising the set of RIs determined in 404 (step 410) and the route is then associated with the new next-hop created in 410 (step 412).

As described above, significant memory savings can be achieved by enabling sharing of next-hops. However, there is still some level of redundancy in the embodiments depicted in FIGS. 3A and 3B in that the same RI is repeated in multiple next-hops. For example, in the embodiment depicted in FIG. 3A, next-hops NH1 and NH2 both store a copy of RI (e2, Q). Further memory savings can be achieved by reducing this redundancy among RIs. In one embodiment, this is achieved by enabling a single RI to be shared by multiple next-hops. In this embodiment, the need to store multiple copies of an RI in instances where the RI is part of multiple next-hops is eliminated.

Figure 5:
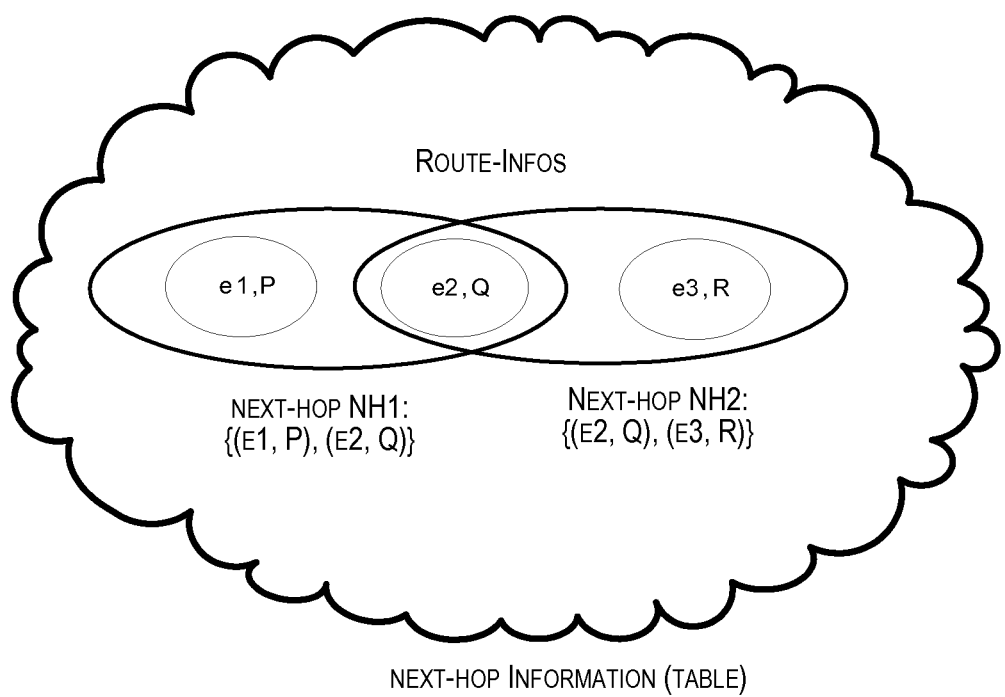
FIG. 5 depicts a logical view of how a route-infos may be shared between multiple next-hops according to an embodiment of the present invention.

FIG. 5 depicts a logical view of how an RI may be shared between multiple next-hops according to an embodiment of the present invention. In the embodiment depicted in FIG. 5, two next-hops are defined: a first next-hop NH1 comprising RIs (e1, P) and (e2, Q) and a second next-hop NH2 comprising RIs (e2, Q) and (e3, R). As can be seen, RI (e2, Q) occurs in both the next-hops. Accordingly, a single copy of RI (e2, Q) is stored and shared between next-hops NH1 and NH2. Both next-hops refer to the same copy of RI (e2, Q). In this manner, the need to store multiple copies of the RI, one for each next-hop is eliminated. This translates to a further reduction in the amount of memory needed to store next-hop information associated with a routing table.

Figure 6:
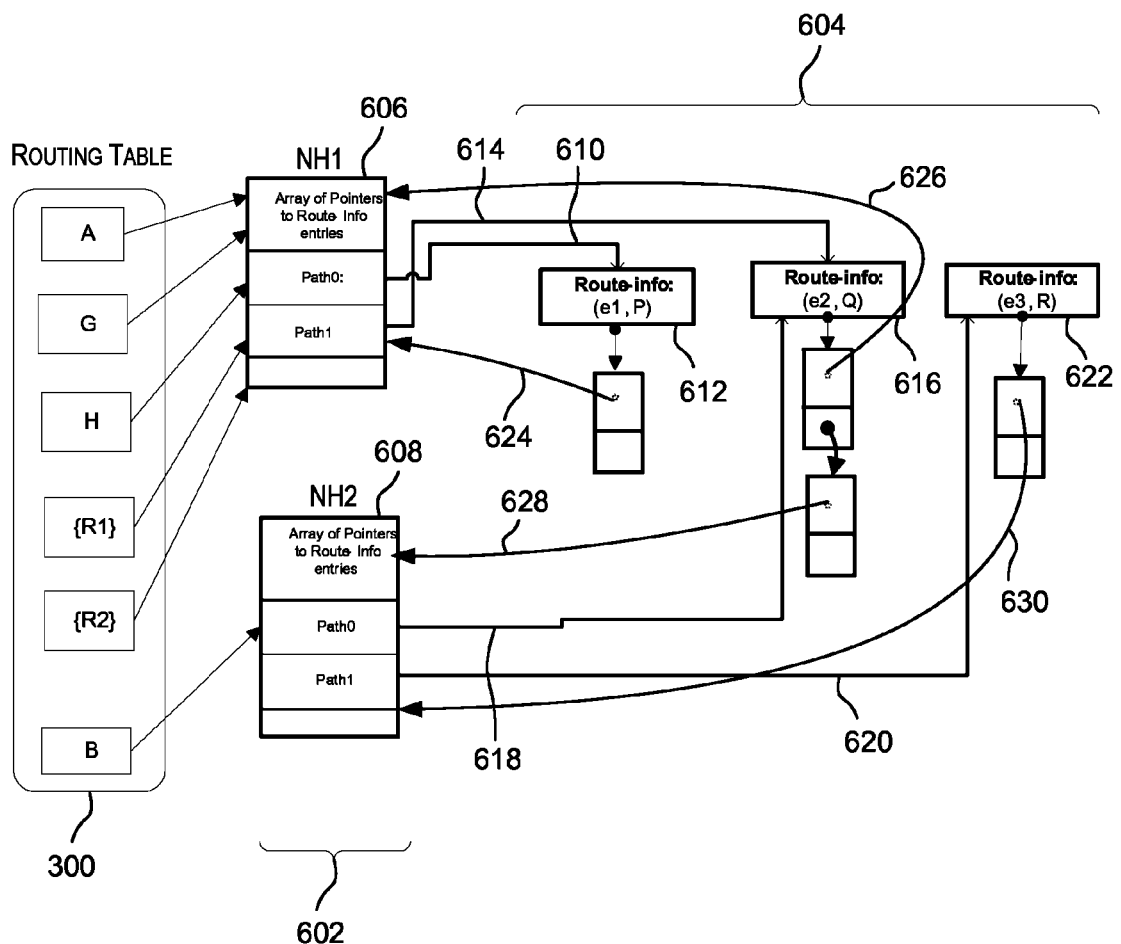
FIG. 6 shows data structures that may be used to enable sharing of next-hops between routes in a routing table and also to enable sharing of route-infos between next-hops according to an embodiment of the present invention.

There are different ways in which sharing of RIs between next-hops may be implemented. FIG. 6 shows memory (data) structures that may be used to enable sharing of next-hops between routes in a routing table and also to enable sharing of RIs between next-hops according to an embodiment of the present invention. As depicted in FIG. 6, a set of data structures are associated with routing table 300 for storing next-hop information. These data structures include data structures 602 for storing next-hops, and data structures 604 for storing RIs included in the next-hops. Each route in routing table 300 is associated with (or points to) a next-hop from the set of next-hops 602. Multiple routes in routing table 300 may be associated with (e.g., point to) the same next-hop, thereby sharing the next-hop between the routes. For example, in FIG. 6, routes associated with network device A, network device G, network device H, routes in set {R1} representing routes in network 104, and routes in set {R2} representing routes in network 106 all are associated with (or point to) the same next-hop NH1 606. The route associated with network device B points to next-hop NH2 608.

In the embodiment depicted in FIG. 6, each next-hop is implemented as an array of pointers. Each array entry corresponds to an RI included in the next-hop with the array entry for an RI comprising a pointer pointing to an RI from the set of RIs 604 that is included in that next-hop. For example, in FIG. 6, next-hop NH1 comprises two RIs (e1, P) and (e2, Q). Accordingly, array 606 representing next-hop NH1 comprises one pointer 610 pointing to RI (e1, P) 612 and a second pointer 614 pointing to RI (e2, Q) 616. Next-hop NH2 comprises two RIs (e2, Q) and (e3, R). Accordingly, array 608 representing next-hop NH2 comprises one pointer 618 pointing to RI (e2, Q) 616 and a second pointer 620 pointing to RI (e3, R) 622. It should be noted that pointer 614 of array 606 representing NH1 and pointer 618 of array 608 representing NH2 both point to the same RI 616. RI (e2, Q) 616 is thus shared between the two next-hops.

From a memory storage perspective, a memory object or portion of memory storing information for an RI may be shared between multiple next-hops. For example, memory object 616 or a portion of memory storing information for RI (e2, Q) is shared by next-hops NH1 and NH2. Multiple next-hops may thus reference the same portion of memory storing information for an RI. Accordingly only a single memory object is stored for RI (e2, Q).

By enabling sharing of RIs between next-hops, each next-hop does not need to maintain its own separate copy of an RI. The sharing of RIs enables redundant RI information to be consolidated into a single RI that can be shared by different next-hops. Accordingly, a single copy is stored for each unique RI in the set of RIs 604. This further reduces the amount of memory required for storing next-hop information associated with a routing table since redundant storage of RIs is eliminated.

As described above, the pointers in an array representing a next-hop may be used to determine all the RIs included in that next-hop. Given an RI, it is also useful to determine all the next-hops that the RI is a member of This "back-referencing" from an RI to the next-hop that includes that RI may be implemented using different techniques. In the embodiment depicted in FIG. 6, this back-referencing is enabled using a set of back-pointers from each RI to the next-hops referencing that RI. In FIG. 6, the back-pointers are implemented as a linked list of pointers that are associated with the RI. For a particular RI, the number of back-pointers associated with the RI may represent the number of next-hops that reference or include that RI, with each back-pointer pointing to a next-hop including that RI.

For example, the linked list associated with RI 612 comprises one back-pointer 624 indicating that RI (e1, P) is included in one next-hop. Pointer 624 points to next-hop NH1 606 indicating that next-hop NH1 comprises RI 612. The linked list associated with RI 616 comprises two back-pointers 626 and 628, thereby indicating that RI (e2, Q) 616 is included and shared by two next-hops. Pointer 626 points to next-hop NH1 606 indicating that next-hop NH1 comprises RI 616 and pointer 628 points to next-hop NH2 608 indicating that next-hop NH2 also comprises RI 616. The linked list for RI 622 comprises one back-pointer link 630 indicating that RI (e3, R) is included in one next-hop with pointer 630 pointing to next-hop NH2 608 indicating that next-hop NH2 comprises RI 622.

The back-pointers are useful for quickly and efficiently determining all next-hops that are affected, and which may potentially need to be updated, when there is a change in a particular RI. Examples of changes in the network environment that may cause an RI to be changed include but are not restricted to an interface or link goes down, a new interface or link is added to the network, an attribute (e.g., cost) associated with an interface changes, and the like. For example, if an attribute of an interface or link changes, all RIs comprising that interface may be determined and back-pointers associated with the determined RIs may be used to identify all the next-hops of which the RIs are members. The next-hops that are identified may then be appropriately updated. For example, if interface e3 in FIG. 1 goes down, then it may be determined that e3 is included in RI 622 in FIG. 6. Using back-pointer 630 associated with next-hop 622, it may be determined that only next-hop NH2 includes an RI comprising e3 and may be updated. The one or more next-hops to be updated can thus be determined without having to walk through all the next-hops.

As described above, in one embodiment, given an interface or link (e.g., an interface that has changed), all RIs that comprise the given interface may be determined. Different techniques may be used to implement this. In one embodiment, the given interface may be subjected to one or more hash functions and the hash output may identify all the RIs that comprise the interface. For example, the hash output may point to a list of one or more RIs, and the list may then be traversed to identify RIs that comprise the given interface. In one embodiment, the list pointed to by the hash output may comprise only those RIs that include the given interface. In another embodiment, the list may also comprise RIs that do not contain the given interface; this list may then be traversed to determine those RIs that comprise the given interface.

Figure 7:
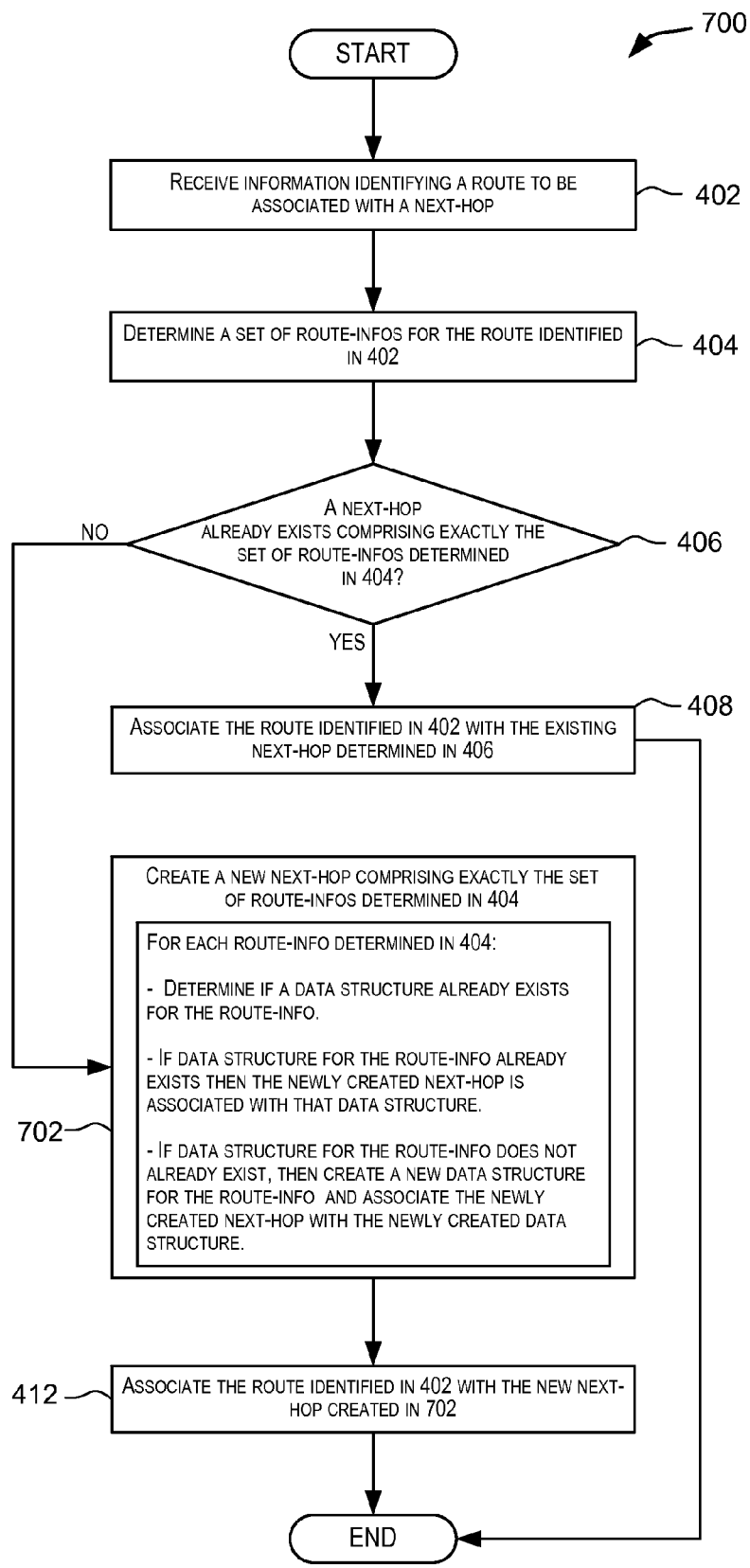
FIG. 7 depicts a high level simplified flowchart depicting a method performed by a network device for associating a route in a routing table with a next-hop and associating next-hops with route-infos according to an embodiment of the present invention.

FIG. 7 depicts a high level simplified flowchart 700 depicting a method performed by a network device for associating a route in a routing table with a next-hop and associating next-hops with RIs according to an embodiment of the present invention. The processing depicted in FIG. 7 may be performed in software (e.g., instructions, code, program) executed by a processor, in hardware, or combinations thereof The software may be stored on a computer-readable storage medium. In one embodiment, the method may be performed by a network device depicted in FIG. 1, for example, network device X.

The processing performed in FIG. 7 is substantially similar to the processing depicted in FIG. 4, except for steps for sharing RIs. The next-hops in FIG. 7 are capable of sharing RIs. In FIG. 7, upon determining in 406 that a next-hop that includes exactly the set of RIs determined in 404 does not already exist, then a new next-hop is created comprising the set of RIs determined in 404 (step 702). As part of 702, for each route-info determined in 404, the following processing is performed: (a) It is determined if a data structure already exists for the route-information; (b) If it is determined that a data structure for the route-info already exists then the newly created next-hop is associated with that data structure (in this manner, the RI is shared with another next-hop); and (c) If it is determined that the data structure for the route-info does not already exist, then a new data structure is created for the route-info and the newly created next-hop is associated with the newly created data structure.

By sharing RIs between next-hops, the amount of memory needed for storing RIs is reduced. For the embodiments depicted in FIGS. 3A and 3B, where RIs are not shared and assuming that a memory object is used for storing an RI, the number of the memory objects required is directly related to the number of next-hops and at a minimum equal to the number of next-hops. However, by sharing RIs, the number of memory objects may be reduced since one memory object storing information for an RI may be shared between multiple next-hops. In such an embodiment, the number of memory objects needed for storing RIs may even be less than the number of next-hops.

Figure 8:
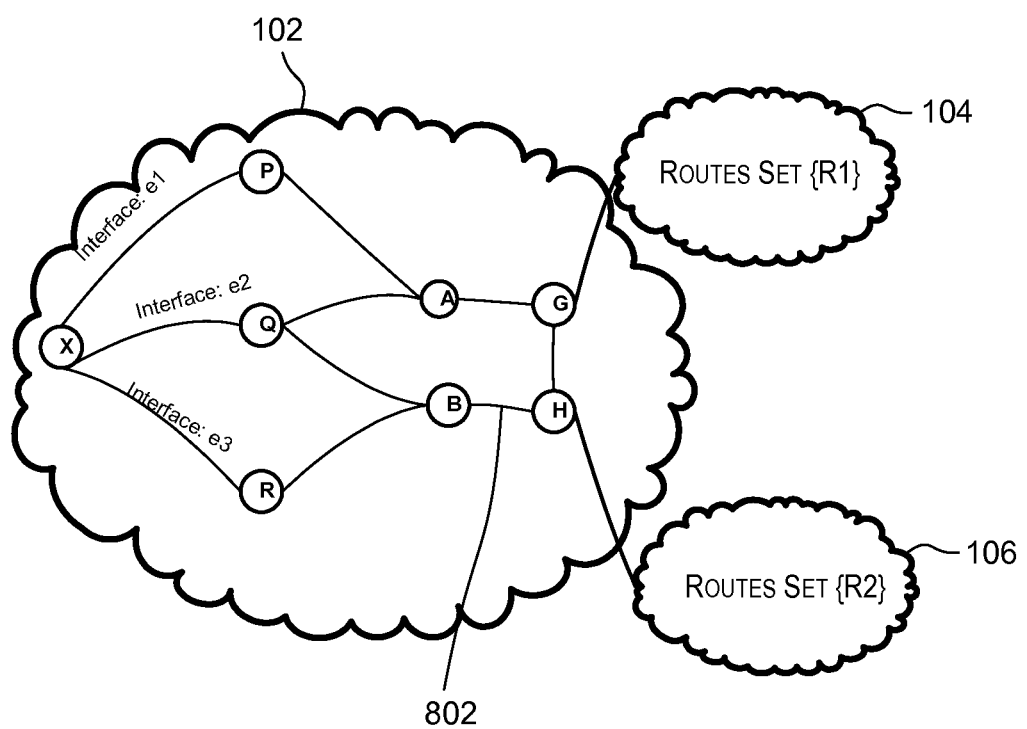
FIG. 8 is a simplified diagram of a network environment that may incorporate an embodiment of the present invention.

In the embodiments described above, as a result of sharing of next-hops, no two next-hops have the same set of RIs. However, in certain instances, it may be desirable to have two or more separate next-hops even though the set of RIs included in the next-hops is the same. For example, consider the routes in set {R1} in network 104 and the routes in set {R2} in network 106. According to the embodiment depicted in FIG. 3A and described above, the routes in {R1} and {R2} all share the same next-hop NH1. Now, suppose a new link 802 is added from B to H, as depicted in FIG. 8. As a result of the addition of the new link, all the routes {R2} from network 106 will no longer take next-hop NH1 but would switch to using next-hop entry NH2. As a result of this, all routes {R2} in the routing table will have to be updated to point to next-hop NH2. The time required to complete these updates will be proportional to the number of routes in {R2} . Since the number of routes in {R2} could be quite large, these updates could consume valuable time and processing resources.

In one embodiment of the invention, such updates may be avoided by having two different next-hops with the same set of RIs. In order to differentiate between such next-hops that have the same set of RIs, a new attribute is added to each next-hop. For example, a new "color" attribute may be added to the next-hops. Next-hops having the same set of RIs may be "colored" differently to differentiate the next-hops from one another. Using the "color" attribute, multiple next-hops may be created, each with the same set of RIs but having different associated colors. Different next-hop identifiers are assigned to the different colored next-hops. In one embodiment, next-hops with different colors but the same set of RIs may be created based upon different administrative characteristics. In such an embodiment, routes in a routing table may reference "colored" next-hops. A single next-hop with a particular color may be shared between multiple routes.

Applying the concept of "colored" next-hops to routes {R1} and {R2} in FIG. 8, a third next-hop NH3 may be defined that has the same set of RIs as NH1 but is colored differently from NH1. The set of routes {R2} share the same characteristics, as determined by upper layer application protocols, and may be assigned to next-hop NH3. The set of routes {R1} share the same characteristics, as determined by upper layer application protocols, and may be assigned to next-hop NH1. The set of RIs in NH3 and NH1 are identical but NH3 and NH1 are colored differently and are assigned and referenced using different IDs.

Figure 9:
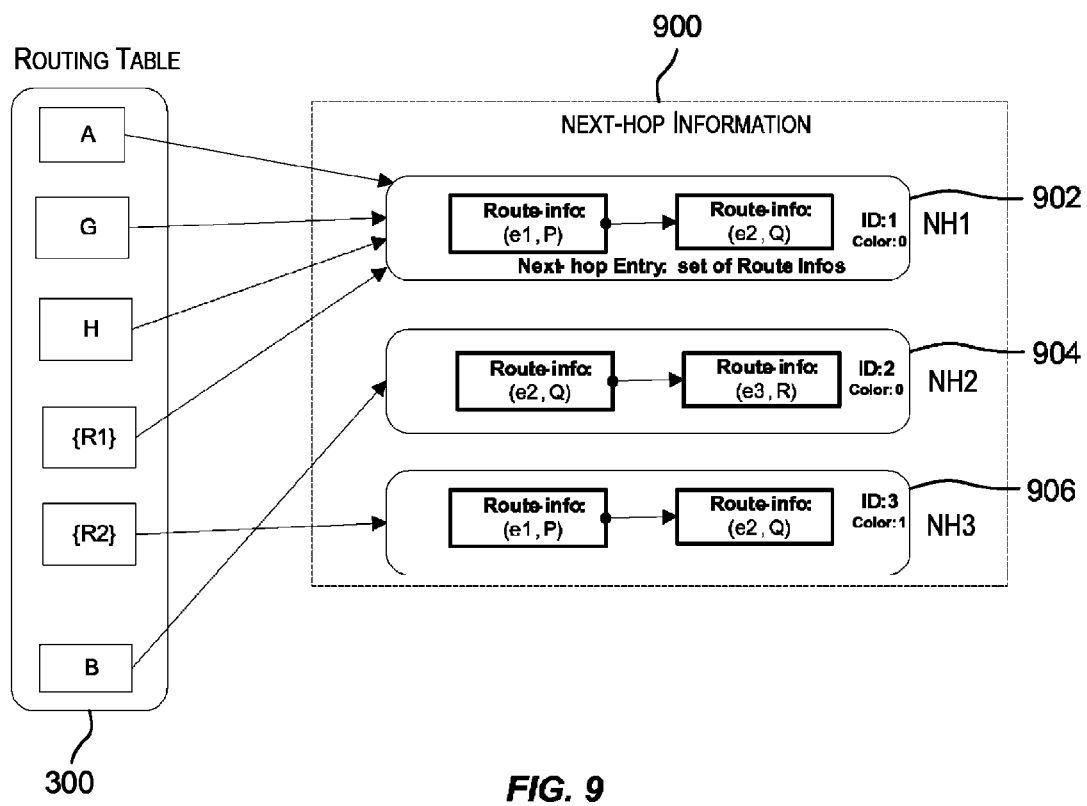
FIG. 9 depicts a simplified logical view of next-hop information comprising colored next-hops according to an embodiment of the present invention.

FIG. 9 depicts a simplified logical view of next-hop information comprising colored next-hops according to an embodiment of the present invention. FIG. 9 depicts routing table 300 and associated next-hop information 900 that may be stored by network device X for the network environment depicted in FIG. 1. As depicted in FIG. 9, three next-hops NH1 902, NH2 904, and NH3 906 are defined, with each next-hop having an associated color attribute. It should be noted that next-hops NH1 902 and NH3 906 have the same set of RIs {(e1, P), (e2 Q)} but have different associated colors (color=0 for NH1 and color=1 for NH3) and different IDs (ID=1 for NH1 and ID=3 for NH3). Each route in set {R1} is associated with next-hop NH1 while each route in set {R2} is associated with next-hop 906. In alternative embodiments, colored next-hops may be implemented using other techniques such as using the data structures depicted in FIG. 6.

Figure 10:
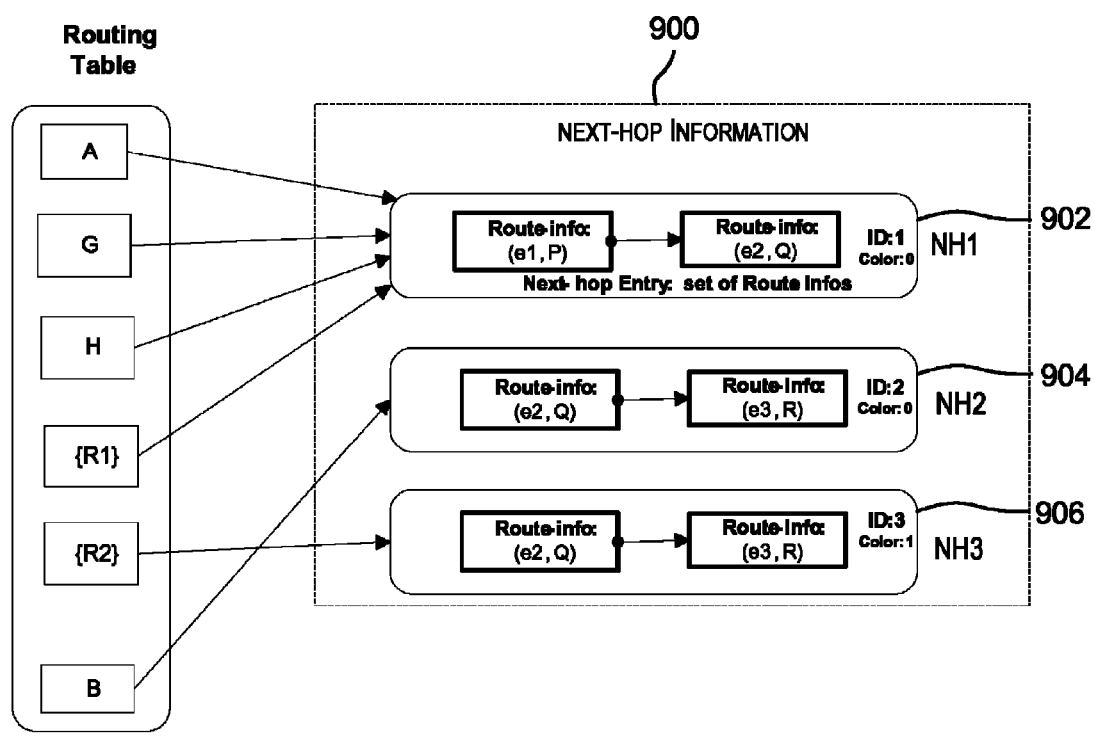
FIG. 10 depicts a simplified logical view of updated next-hop information comprising colored next-hops in response to addition of a link according to an embodiment of the present invention.

When link 802 between network devices B and H is added as depicted in FIG. 8, instead of having to change the associations between the routes in {R2} from NH1 to NH2 as described above for the non-colored embodiment, using colored next-hops, only the contents of next-hop NH3 906 need to be modified to reflect the new set of RIs, namely, {(e2, Q), (e3, R)}. FIG. 10 depicts a simplified logical view of updated next-hop information comprising colored next-hops in response to addition of a link according to an embodiment of the present invention. Comparing FIG. 9 to FIG. 10, it can be seen that the contents of next-hop NH3 906 have been updated due to the addition of link B to H. The updated contents of next-hop NH3 include the set of RIs {(e2, Q), (e3, R)}. After the update, the set of RIs included in next-hop NH3 is the same as the set of RIs in NH2, but the two next-hops are different with different IDs and different colors.

In one embodiment, by using colored next-hops, updates to the next-hop information for routes {R2} arising from the addition of the link from B to H is accomplished simply by updating the contents of next-hop NH3. The routes {R2} in the routing table still point to the same next-hop NH3 and do not need to be updated. In other words, the mapping from routes {R2} in the routing table to next-hops did not need to be updated; the update occurred only in the contents of the next-hop pointed to by the routes. The total time for the update process is thus reduced from being proportional to the number of routes in {R2} to a single next-hop content update operation, thereby significantly reducing the processing time needed for the update operation.

Figure 11A:
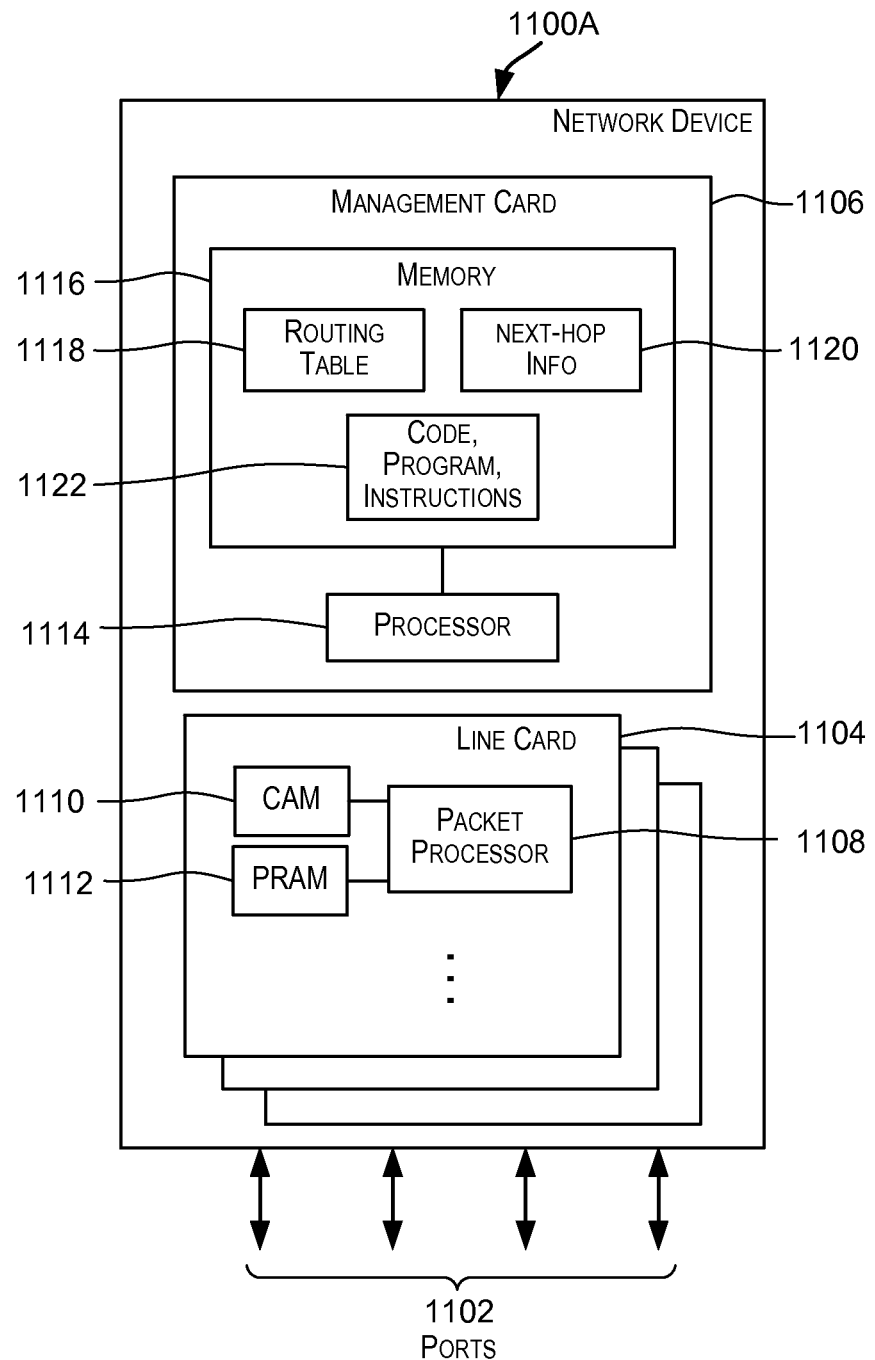
FIG. 11A depicts a simplified block diagram of a network device that may be configured to optimize storage and use of next-hop information according to an embodiment of the present invention.

FIG. 11A depicts a simplified block diagram of a network device 1100A that may be configured to optimize storage and use of next-hop information according to an embodiment of the present invention. Network device 1100A may be a router or switch that is configured to forward data such as a router or switch provided by Brocade Communications Systems, Inc. In the embodiment depicted in FIG. 11A, network device 1100A comprises a plurality of ports 1102 for receiving and forwarding data packets and multiple cards that are configured to perform processing to facilitate forwarding of the data packets. The multiple cards may include one or more line cards 1104 and one or more management cards 1106. A card, sometimes also referred to as a blade or module, can be inserted into one of a plurality of slots on the chassis of network device 1100A. This modular design allows for flexible configurations with different combinations of cards in the various slots of the device according to differing network topologies and switching requirements. The components of network device 1100A depicted in FIG. 11A are meant for illustrative purposes only and are not intended to limit the scope of the invention in any manner. Alternative embodiments may have more or less components than those shown in FIG. 11A.

Ports 1102 represent the I/O plane for network device 1100A. Network device 1100A is configured to receive and forward data using ports 1102. A port within ports 1102 may be classified as an input port or an output port depending upon whether network device 1100A receives or transmits a data packet using the port. A port over which a data packet is received by network device 1100A is referred to as an input port. A port used for communicating or forwarding a data packet from network device 1100A is referred to as an output port. A particular port may function both as an input port and an output port. A port may be connected by a link or interface to a neighboring network device or network. Ports 1102 may be capable of receiving and/or transmitting different types of data traffic at different speeds including 1 Gigabit/sec, 10 Gigabits/sec, or more. In some embodiments, multiple ports of network device 1100A may be logically grouped into one or more trunks.

Upon receiving a data packet via an input port, network device 1100A is configured to determine an output port for the packet for transmitting the data packet from the network device to another neighboring network device or network. Within network device 1100A, the packet is forwarded from the input network device to the determined output port and transmitted from network device 1100A using the output port. In one embodiment, forwarding of packets from an input port to an output port is performed by one or more line cards 1104. Line cards 1104 represent the data forwarding plane of network device 1100A. Each line card 1104 may comprise one or more packet processors 1108 that are programmed to perform forwarding of data packets from an input port to an output port. A packet processor on a line card may also be referred to as a line processor. Each packet processor 1108 may have associated memories to facilitate the packet forwarding process. In one embodiment, as depicted in FIG. 11A, each packet processor 1108 may have an associated content addressable memory (CAM) 1110 and a RAM 1112 for storing forwarding parameters (RAM 1112 may accordingly also be referred to as a parameter RAM or PRAM). In one embodiment, for a packet received via an input port, the packet is provided to a packet processor 1108 of a line card 1104 coupled to the input port. The packet processor receiving the packet is configured to determine an output port of network device 1100A to which the packet is to be forwarded based upon information extracted from the packet. The extracted information may include, for example, the header of the received packet. In one embodiment, a packet processor 1108 is configured to perform a lookup in its associated CAM 1110 using the extracted information. A matching CAM entry then provides a pointer to a location in the associated PRAM 1112 that stores information identifying how the packet is to be forwarded within network device 1100A. Packet processor 1108 then facilitates forwarding of the packet from the input port to the determined output port.

Since processing performed by a packet processor 1108 needs to be performed at a high packet rate in a deterministic manner, packet processor 1108 is generally a dedicated hardware device configured to perform the processing. In one embodiment, packet processor 1108 is a programmable logic device such as a field programmable gate array (FPGA). Packet processor 1108 may also be an ASIC.

Management card 1106 is configured to perform management and control functions for network device 1100A and thus represents the management plane for network device 1100A. In one embodiment, management card 1106 is communicatively coupled to line cards 1104 and includes software and hardware for controlling various operations performed by the line cards. In one embodiment, a single management card 1106 may be used for all the line cards 1104 in network device 1100A. In alternative embodiments, more than one management cards may be used, with each management card controlling one or more line cards.

A management card 1106 may comprise a processor 1114 (also referred to as a management processor) that is configured to perform functions performed by management card 1106 and associated memory 1116. As depicted in FIG. 11A, the routing table 1118 and associated next-hop and RI information may be stored in memory 1116. The next-hop and RI information may be stored and used in an optimized manner as described above. Memory 1116 is also configured to store various programs/code/instructions 1122 and data constructs that are used for processing performed by processor 1114 of management card 1106. For example, programs/code/instructions, which when executed by processor 1114 cause the next-hop information to be stored in an optimized manner may be stored in memory 1116. In one embodiment, processor 1114 is a general purpose microprocessor such as a PowerPC, Intel, AMD, or ARM microprocessor, operating under the control of software 1122 stored in associated memory 1116.

In one embodiment, the functions performed by management card processor 1114 include maintaining a routing table, creating associations between routes in the routing table and next-hop information, updating the routing table and associated next-hop information responsive to changes in the network environment, and other functions. In one embodiment, management processor 1114 is configured to program the packet processors and associated memories of line cards 1104 based upon the routing table and associated next-hop information. Programming the packet processors and their associated memories enables the packet processors to perform data packet forwarding in hardware. As part of programming a line card packet processor and its associated memories, management processor 1114 is configured to download routes and associated next-hops information to the line card and program the packet processor and associated memories. Updates to the next-hop information are also downloaded to the line cards to enable the packet processors on the line cards to forward packets using the updated information.

Figure 11B:
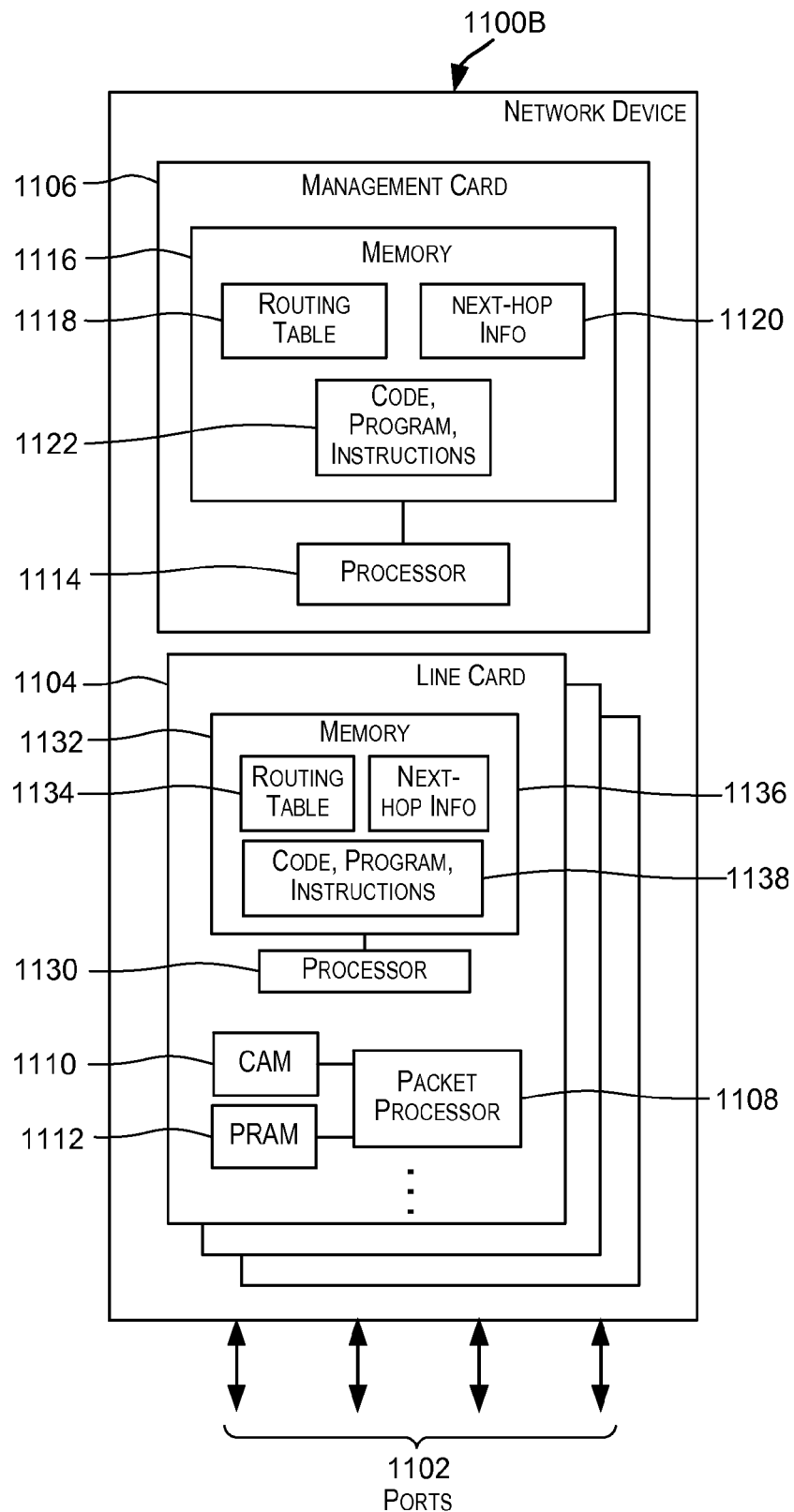
FIG. 11B depicts another example of a network device that may incorporate an embodiment of the present invention.

FIG. 11B depicts another example of a network device 1100B that may incorporate an embodiment of the present invention. Network device 1100B is similar to network device 1100A depicted in FIG. 11A and described above except that line card 1104 additionally comprises a processor 1130 and associated memory 1132. Processor 1130 may be a CPU similar to management processor 1114. In this embodiment, line card memory 1132 may store routing table 1134 and associated next-hop information 1136. Processor 1130 uses the routing and next-hop information stored in memory 1132 to program the packet processors and their associated memories on the line card. In one embodiment, routing table 1134 and associated next-hop information 1136 is kept synchronized with routing table 1118 and next-hop information 1120 stored by management card 1106. Management card 1106 is configured to download the routing and associated next-hop information stored in its memory 1116 to a line card 1104. The routing and next-hop information downloaded to a line card 1104 from the management card is then stored in memory 1132 of the line card and used to program packet processors 1108 and their associated memories. When changes are made to the routing table and associated next-hop information stored in management card 1106, the changes are downloaded to the line card so that the routing and next-hop information stored in memory 1132 of the line card can be updated to reflect the changes.

As described above, for both network device embodiments depicted in FIGS. 11A and 11B, routing table and associated next-hop information is downloaded from a management card to a line card. In the embodiment depicted in FIG. 11A the information may be downloaded as part of the management processor programming the packet processors and associated memories on the line card. For the embodiment depicted in FIG. 11B, the information may be downloaded and stored in memory 1132 on the line card. Processor 1130 on the line card may then use the stored information to program the packet processors and their associated memories. In one embodiment, the whole routing table and associated next-hop information is downloaded to the line card from the management card. The use of sharable next-hops and sharable RIs, as described above, makes the process of updating the line cards fast and efficient. In the past, downloading routing table and associated next-hop information to a line card from the management processor involved downloading to the line card information identifying each of the routes in the routing table and, for each route, next-hop information for the route. For example, for the implementation depicted in FIG. 2, the information sent to the line card included information identifying route A and associated next-hop information comprising RIs {(e1, P), (e2, Q)} associated with route A, information identifying route G and associated next-hop information comprising RIs {(e1, P), (e2, Q)} associated with route G, information identifying route H and associated next-hop information comprising RIs {(e1, P), (e2, Q)} associated with route H, and so on. In this implementation, a large amount of replicated next-hop information data is sent to the line card. In one embodiment, by enabling sharing of next-hops, the number of next-hops is reduced thereby reducing the amount of next-hop information that is provided to the line card. For example, for the embodiment depicted in FIG. 3A, the information provided to a line card may include information for NH1, information for NH2, a list of routes associated with NH1, and a list of routes associated with NH2. In this manner, the next-hop associated with each route in the routing table does not have to be downloaded. Information identifying associations between a route and a next-hop may include a router identifier and the ID of the next-hop to be associated with the route. In this manner, the associated next-hop does not have to be downloaded for each route. The total amount of data provided to the line card is thus greatly reduced since the communication of redundant next-hop information is avoided.

Further, the information for the next-hops (e.g., NH1 and NH2) needs to be downloaded only once. If subsequently there is a change in an association between a route and an existing next-hop, only the change in ID information is downloaded to the line card. For example, if the next-hop for a route changes from NH1 to NH2, information for NH2 does not need to be resent—only information indicating that the route is to be associated with NH2 (instead of NH1) is sent.

Further, if the content of a next-hop changes but the associations of routes to that next-hop remain the same (e.g., change in content of NH3 due to addition of link B to H in FIG. 8), then only that next-hop contents are sent to the line card—only one such download is needed. In this manner, sharing of next-hops reduces the amount of data that is sent to a line card from the management processor. This makes line card updates faster and enables fast forwarding convergence time on the line card or forwarding plane.

Figure 12:
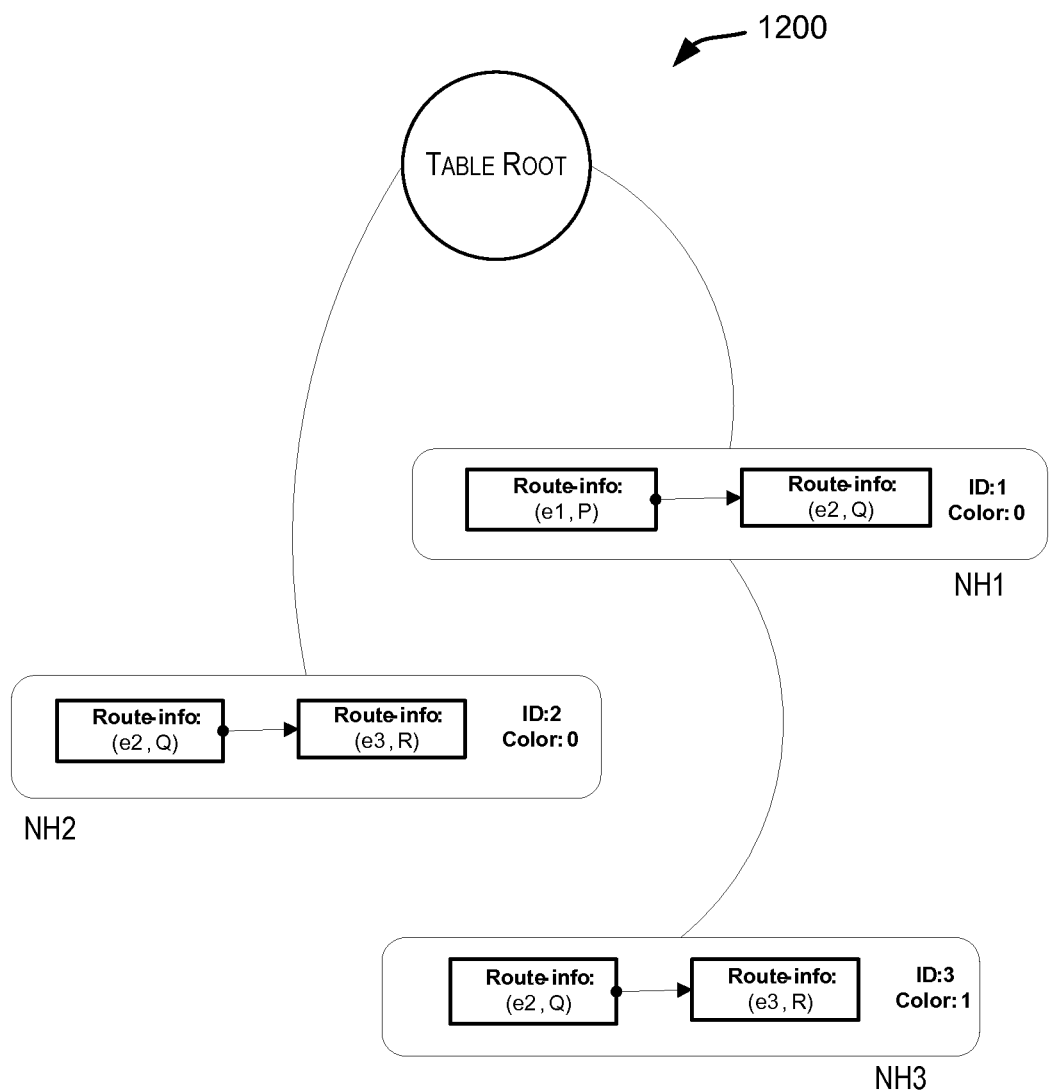
FIG. 12 depicts a simplified binary tree for searching next-hop IDs according to an embodiment of the present invention.

As described above, each next-hop is assigned a next-hop ID that may be used to reference the next-hop. For example, next-hops may be added, deleted, searched for, etc. using their next-hop IDs. In one embodiment, a next-hop search table may be provided to facilitate searching of next-hops given their assigned IDs. In one embodiment, the next-hop search table is implemented as a balanced binary tree keyed on the next-hop ID. FIG. 12 depicts a simplified binary tree 1200 for searching next-hop IDs according to an embodiment of the present invention.

In alternative embodiments, it may be useful to be able to search for next-hops based upon their contents. For example, to determine if a next-hop exists with a specific set of RIs. To facilitate such searches a second balanced tree may be provided keyed on the contents (e.g., set of RIs and color attribute value) of next-hops.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A network device comprising:
a memory configurable to:
store a routing table comprising a plurality of routes; and
store next-hop information associated with the routing table, the next-hop information comprising a set of two or more next-hops, each next-hop associated with an attribute, each next-hop associated with a set of one or more pairs, each pair identifying a link and an address, the set of two or more next-hops comprising a first next-hop associated with a first route in the plurality of routes, the first next-hop stored in a first portion of the memory, the attribute associated with the first next-hop set to a first value; and
a processor communicatively coupled to the memory, the processor configurable to:

associate a second route in the plurality of routes with the first next-hop stored in the first portion of the memory; and associate a third route in the plurality of routes with a second next-hop stored in a second portion of the memory, wherein the set of one or more pairs associated with the second next-hop is identical to the set of one or more pairs associated with the first next-hop, and the attribute associated with the second next-hop is set to a second value that is different from the first value, and wherein when the set of one or more pairs associated with the second next-hop changes, the set of one or more pairs associated with the first next-hop does not change due to the second value being different from the first value.

2. The network device of claim 1 wherein the processor is configurable to:

determine a first set of pairs for the second route; and determine whether the set of two or more next-hops comprises a next-hop that comprises exactly the first set of pairs.

3. The network device of claim 2 wherein the processor is configurable to determine that the first next-hop comprises exactly the first set of pairs.

4. The network device of claim 1 wherein the number of next-hops in the set of two or more next-hops is less than the number of routes in the plurality of routes.

5. A computer-readable memory comprising a plurality of instructions for controlling a processor to store information used for forwarding data packets received by a network device, the plurality of instructions comprising:

instructions that cause the processor to store a routing table comprising a plurality of routes;

instructions that cause the processor to store next-hop information associated with the routing table, the next-hop information comprising a set of two or more next-hops, each next-hop associated with an attribute, each next-hop associated with a set of one or more pairs, each pair identifying a link and an address, the set of two or more next-hops comprising a first next-hop associated with a first route in the plurality of routes, the first next-hop stored in a first memory portion, the attribute associated with the first next-hop set to a first value;

instructions that cause the processor to associate a second route in the plurality of routes with the first next-hop stored in the first memory portion; and instructions that cause the processor to associate a third route in the plurality of routes with a second next-hop stored in a second memory portion, wherein the set of one or more pairs associated with the second next-hop is identical to the set of one or more pairs associated with the first next-hop, and the attribute associated with the second next-hop is set to a second value that is different from the first value, and wherein when the set of one or more pairs associated with the second next-hop changes, the set of one or more pairs associated with the first next-hop does not change due to the second value being different from the first value.

6. The computer-readable memory of claim 5 wherein the plurality of instructions comprises:

instructions that cause the processor to determine a first set of pairs for the second route; and instructions that cause the processor to determine whether the set of two or more next-hops comprises a next-hop that comprises exactly the first set of pairs.

7. The computer-readable memory of claim 6 wherein the instructions that cause the processor to determine whether the set of two or more next-hops comprises a next-hop that comprises exactly the first set of pairs comprises instructions that cause the processor to determine that the first next-hop comprises exactly the first set of pairs.

8. The computer-readable memory of claim 5 wherein the number of next-hops in the set of two or more next-hops is less than the number of routes in the plurality of routes.

9. A method comprising:

storing, in a network device, a routing table comprising a plurality of routes;

storing, in the network device, next-hop information associated with the routing table, the next-hop information comprising a set of two or more next-hops, each next-hop associated with an attribute, each next-hop associated with a set of one or more pairs, each pair identifying a link and an address, the set of two or more next-hops comprising a first next-hop associated with a first route in the plurality of routes, the first next-hop stored in a first memory portion of the network device, the attribute associated with the first next-hop set to a first value;

associating, by the network device, a second route in the plurality of routes with the first next-hop stored in the first memory portion of the network device; and associating, by the network device, a third route in the plurality of routes with a second next-hop stored in a second memory portion of the network device, wherein the set of one or more pairs associated with the second next-hop is identical to the set of one or more pairs associated with the first next-hop, and the attribute associated with the second next-hop is set to a second value that is different from the first value, and wherein when the set of one or more pairs associated with the second next-hop changes, the set of one or more pairs associated with the first next-hop does not change due to the second value being different from the first value.

* * * * *